March 6, 1928.

J. C. ENGLAND

CLUTCH

Filed Sept. 9, 1925

1,661,172

Inventor
J. C. England
By D. Swift
Attorney

Patented Mar. 6, 1928.

1,661,172

UNITED STATES PATENT OFFICE.

JAMES CARLTON ENGLAND, OF DILSBORO, NORTH CAROLINA.

CLUTCH.

Application filed September 9, 1925. Serial No. 55,314.

The invention relates to clutches, and has for its object to provide a device of this character particularly adapted for use in connection with compressors of the air type, and which compressors are driven by motors, and has for its object to provide a clutch, which is centrifugally controlled whereby the clutch element will be moved into clutching engagement when the clutch is rotated at a high speed and will be moved out of clutching engagement when the clutch and the motor driving the same drops below a predetermined speed thereby preventing overload on the motor.

A further object is to provide a clutch comprising a drive shaft, a driven element carried by said drive shaft, a pulley adjacent the driven element and centrifugally controlled lever means whereby upon the attaining of a predetermined speed the clutch members will be moved into clutch position. Also to spring means cooperating with the centrifugal means whereby when the pulley is rotated at a predetermined low speed, the clutch elements will be moved out of clutching engagement.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:—

Figure 1:
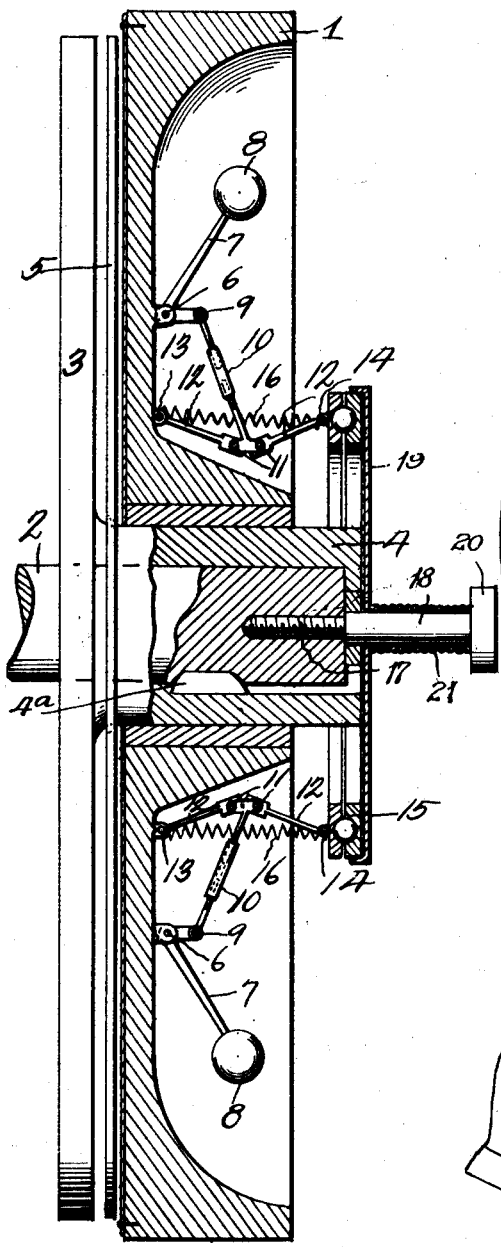
Figure 1 is a vertical longitudinal sectional view through the clutch.
Figure 2:
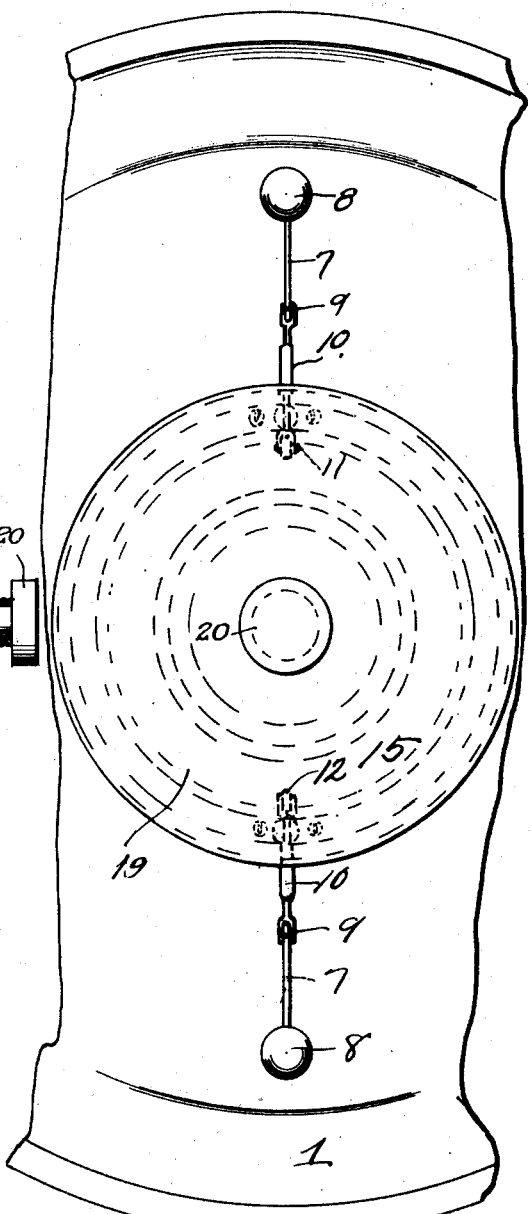
Figure 2 is an end view of the clutch.

Referring to the drawing, the numeral 1 designates a pulley over which a belt is adapted to extend for operating a drive shaft 2 of a compressor, which shaft has mounted thereon a disc 3 having a hub 4. The hub 4 is keyed by means of a key 4ª to the shaft 2; therefore it will be seen as the shaft 2 rotates the disc 3 will be simultaneously rotated. The pulley 1 is rotatably mounted on the hub 4 and is adapted to move axially towards the disc 3 during a clutching operation, and at which time the friction disc 5 which is loosely mounted on the hub 4 is securely clamped between the pulley 1 and the disc 3 for causing the pulley to rotate simultaneously with the shaft 2 and disc 3. Pulley 1 is belted in any suitable manner to an electric motor disposed adjacent the device. Pivotally connected at 6 to the inner side of the pulley 1 are bell crank levers 7, which levers have one of their arms provided with weights 8, and their other arms extending outwardly and pivotally connected at 9 to inwardly and outwardly extending adjustable members 10. The inner ends of the adjustable members 10 have pivotally connected thereto at 11, links 12 which are out of alinement, and one of which links is pivotally connected at 13 to the pulley 1 and the other pivotally connected at 14 to a thrust collar 15.

As the pulley 1 is rotated through the belt connection hereinbefore mentioned to the motor the centrifugal force will force the weights 8 outwardly, thereby forcing the pulley into clutch engagement with the disc 5, and the disc 3, against the action of the coiled springs 16; however when the electric energy in the motor, driving the shaft 2 through the pulley 1, drops in power, it will be seen that the coiled springs 16, incident to the reduced speed of rotation of the pulley, will have sufficient power to overcome the centrifugal action on the weights 8 at the reduced speed, consequently the driving of shaft 2 and the compressor will be stopped. Therefore the load will be relieved from the motor, and burning out of the motor will be obviated. The device is particularly adapted for use in connection with air compressors, however it is to be understood it is applicable for use in connection with any machinery wherein it is desired to prevent an overload on a motor when operating at a reduced speed and with a reduced supply of energy.

Threaded at 17 into the end of the shaft 2 is a headed bolt 18 and surrounding said headed bolt 18 and interposed between the thrust bearing plate 19, and the head 20 of the bolt is a coiled sprinf 21, which coiled spring forces the plate 19 towards the member 4 and maintains said plate in frictional engagement with the member 4, thereby allowing rotation of the entire thrust bearing in case of sticking of any of the parts thereof.

The invention having been set forth what is claimed as new and useful is:—

A clutch comprising a drive shaft, a drive disc carried by said shaft, a hub carried by the drive disc, a pulley forming a clutch element slidably mounted on the hub and cooperating with the drive disc, bell crank levers mounted on the pulley, weights carried by one of the arms of said levers, inwardly and outwardly extending connecting rods connected to the other arms of the bell crank levers, a thrust collar, arms pivotally connected to the thrust collar and to the pulley and extending towards each other and out of alinement with each other, said connecting rods having their inner ends pivotally connected to the adjacent ends of the arms and forming means whereby said inner ends of the arms will be moved to positions beyond alinement and spring means cooperating with the arms for maintaining the same out of alinement.

In testimony whereof I have signed my name to this specification.

JAMES C. ENGLAND.